United States Patent [19]

Chow

[11] Patent Number: 4,780,341

[45] Date of Patent: Oct. 25, 1988

[54] METHOD OF PROTECTING WOOD

[75] Inventor: Suezone Chow, Richmond, Canada

[73] Assignee: Canadian Forest Products Ltd., Vancouver, Canada

[21] Appl. No.: 36,260

[22] Filed: Apr. 9, 1987

[51] Int. Cl.[4] .......................... B05D 1/18; C09D 1/00

[52] U.S. Cl. .................................. 427/440; 106/286.7; 428/541

[58] Field of Search ........................ 427/440; 428/541; 106/286.7

[56] References Cited

U.S. PATENT DOCUMENTS 806,540 12/1905 Hager .

3,214,453 10/1965 Stern, Jr. .......................... 260/429.7

3,305,298 2/1967 Chapman et al. ......................... 21/7

4,154,818 5/1979 Kanada et al. ............... 106/15.05 X 4,234,340 11/1980 Pellico ............................. 106/15.05

4,269,875 5/1981 Bechgaard et al. ................. 427/291

4,461,721 7/1984 Goettsche et al. .................. 252/607

*Primary Examiner*—Michael Lusignan

*Attorney, Agent, or Firm*—Christie, Parker & Hale

[57] ABSTRACT

A method of protecting wood that comprises applying to the surface of the wood a solution of sodium carbonate and sodium borate. In a further aspect wood is protected against fungal growth by applying to the surface of the wood a solution of sodium carbonate.

12 Claims, 2 Drawing Sheets

Figure 1: Western Hemlock Treatment Comparison

Figure 1: Western Hemlock Treatment Comparison
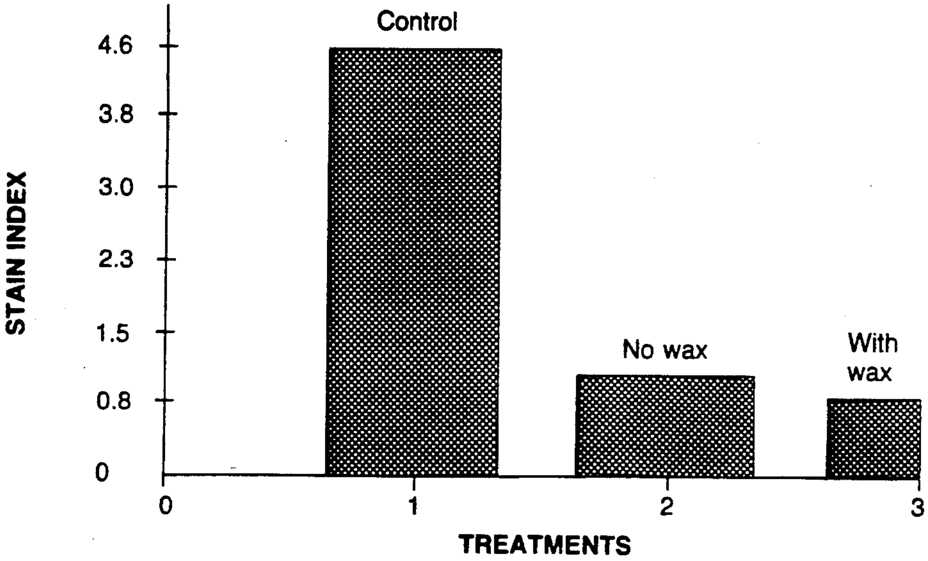
Figure 2: Candle Test of New Chemical Treatments
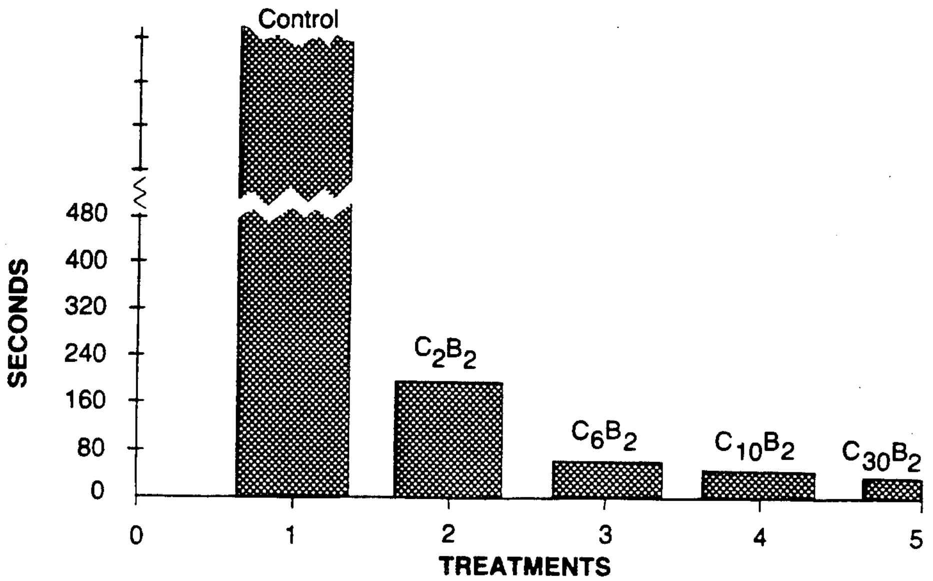

Figure 3: Flame Spread-Deck Test For Plywood
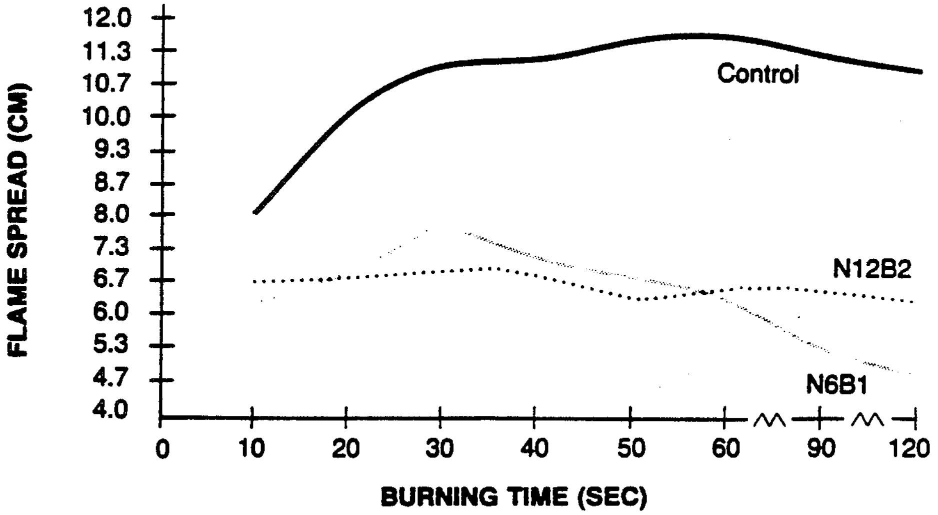
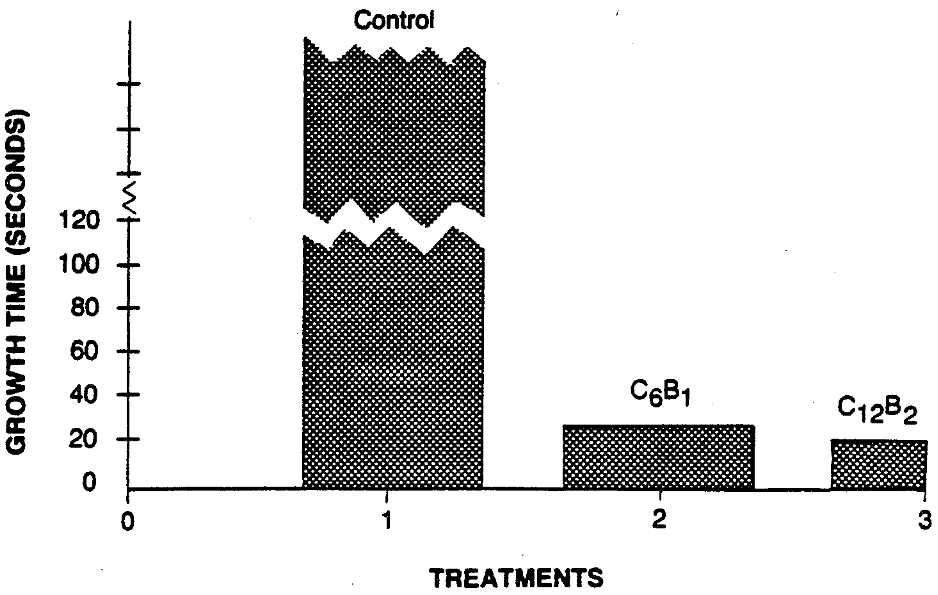

METHOD OF PROTECTING WOOD

BACKGROUND OF THE INVENTION

1. Field of the Invention

This invention relates to a method of protecting wood, more particularly, a method of protecting wood to prevent stain and decay and to improve its fire retardance.

2. Description of the Prior Art

Because wood is an organic substance with a high carbohydrate content, it is an ideal nutrient for fungi and is also susceptible to destruction by fire. The ability of wood products to inhibit both the growth of fungi and spread of fire have long been important concerns.

The majority of wood species which constitute the main volume of commercial lumber have low resistance to sapstain, mold and decay in the green condition. In the warm summer months, green sapwood will be attacked by sapstain fungi in 2 or 3 weeks, producing black and/or blue stains which affect mainly the aesthetic value of the lumber. Further growth of fungi results in decay which weakens the wood structure. Antistain and decay treatment are therefore very important in lumber stored before drying or when shipped in the gree condition, especially when shipped by ocean transport to international markets under warm, humid conditions over several months.

There are many commercial practices for sapstain and decay prevention in lumber. The penta-, tetra-, and tri-chlorophenols in admixture with caustic and/or borax are the most effective, but their toxicity to humans and fish has been a health and environmental concern for a considerable time. The discovery of safer treatments is an urgent requirement of the wood industry.

Fire hazard is still one of the major problems with wood products. The development of treatments which will increase fire resistance of wood is highly desirable to reduce fire losses.

The discovery of treatments that can be bifunctional by both improving resistance to biological attack and increasing fire retardancy is of major importance to the wood industry.

Prior art known to applicant includes U.S. Pat. Nos. 4,461,721 to Goettsche; 4,269,875 to Bechgaard; 4,234,340 to Pellico; 4,154,818 to Kanada; 3,214,453 to Stern; 3,305,298 to Chapman; 806,540 to Hager and 4,061,500 to Hager. Goettsche shows use of boric acid, sodium salt and an organic amine as a means of preserving wood. Bechgaard shows the use of boric oxide as a wood preservative. Pellico features a wood preservative composition including a number of organic compounds. Kanada features a product useful against marine organisms and includes a number of relatively complex organic compounds. Stern is an example of relatively complex compounds being used in wood preservation. Chapman discloses a composition of some considerable complexity. Hager in U.S. Pat. No. 806,540 shows a wood preservative and Hager in U.S. Pat. No. 4,061,500 shows a composition including a fatty acid.

It follows from the above that there is a need to simplify compositions of the preservation of wood, both from the point of view of chemical complexity and toxicity, This invention proposes to use a bifunctinal chemical treatment to substantially reduce the biological staining attack on wood and to improve its fire retardancy properties. Experimental results with sodium carbonate-sodium borate tratment solutions were found to be very satisfactory in this regard, while sodium carbonate by itself was also effective to a lesser degree. To enhance water resistancy, water repellent wax can be added to the antistain solution.

The anti-biological stain concept is based on the ability of the chemical treatments to inhibit the growth of fungi by high alkalinity, by modifying wood sugars through boron complexes and by forming a layer of inorganic elements in the wood surface to isolate food from the fungal spores and fungi, thus denying nutrients to the fungi.

The fire retardant concept of this invention is based on the ability of the chemicals to produce carbon dioxide and to release structural water to retard the growth of fire. In addition, the boron-sugar complexes should contribute to a higher kindling point.

Accordingly, the present invention provides a method of protecting wood that comprises applying to the surface of the wood a solution of sodium carbonate and sodium borate.

DESCRIPTION OF THE PREFERRED EMBODIMENTS

The effectiveness of the chemical or chemical mixtures to inhibit fungal growth on an improve fire retardancy of wood is performed by dissolving the chemicals in water and then wetting the wood through dipping or spraying. A series of laboratory experiments were conducted to examine the validity of this concept in prevention of fungal growth and improvement in fire retardancy.

In the following experiment reference is made to the drawings, in which:

FIG. 1 is a graph relating stain index to defined treatment as discussed in Example 6;

FIG. 2 is a graph relating burning time to treatment as discussed in Exmple 8; and FIG. 3 is a graph relating flame spread and burning time and flame growth and treatment as discussed in Example 10.

ANTI-BIOLOGICAL STAIN PROPERTIES

Example 1: Antistain Effectiveness on Spruce-Pine-Fir

Eleven concentrations of sodium carbonate in water solution were prepared at at 0, 1, 2, 4, 6, 8, 10, 12, 15, 20 and 30 g/100 ml water. Two percent sodium borate by weight (2 g/100 ml of solution) was added to each. After complete dissolution of the inorganic chemicals, the pH level was measured by pH meter. The results are shown in Table 1.

TABLE 1

| Formulation | pH | Infected Area (%) |
|---|---|---|
| Water (Control) | 6.2 | 100 |
| C0B2 | 9.3 | 27 |
| C1B2 | 9.9 | 8 |
| C2B2 | 10.1 | 5 |
| C4B2 | 10.3 | 0 |
| C6B2 | 10.4 | 0 |
| C8B2 | 10.5 | 0 |
| C10B2 | 10.6 | 0 |
| C12B2 | 10.6 | 0 |
| C15B2 | 10.7 | 0 |
| C20B2 | 10.8 | 0 |

TABLE 1-continued

| Formulation | pH | Infected Area (%) |
|---|---|---|
| C30B2 | 10.9 | 0 |

C = Sodium Carbonate
B = Sodium Borate

The numbers in the formulations represent the chemical concentrations.

The pH level of sodium carbonate by itself in water solution measured 11.4 to 11.6 at a chemical concentration of 1 to 20%. The borate addition reduced the pH of the sodium carbonate solutions as a result of the buffering effect of the sodium borate.

These results indicate that high concentrations of the sodium carbonate-sodium borate mixture can be used to effectively coat the wood surface without too high a pH, that is, without a high health or environmental hazard.

To confirm the antistain effect of the chemicals, one sample of sapwood veneer (12 in. by 12 in.) was collected from each of 20 logs of spruce-pine-fir at a plywood mill. The average moisture content was 145% (bone-dry wood basis) (standard deviation 50.9%).

Each veneer sample was cut into 12 strips (1 in. wide by 12 in. long). One strip from each veneer was randomly selected and placed in a group. Thus a total of 12 strip groups with matched veneer was established.

Each veneer group was then sprayed with one of the chemical formulations, air dried for 4 hours and then sprayed with a fungal spore solution. The veneer groups were incubated at 22°-25° C. for observation of fungal growth. Fungi started to grow on control veneers by the fifth day of incubation. By the seventh day, about 60% and by the twelfth day, 80% of the control veneers were infected. However, at this time all treated groups showed no signs of growth. After 5 months' incubation the control veneers showed 100% of the surface areas infected with fungi, while C0B2, C1B2, and C2B2 treatments showed only 27, 8 and 5% area infection respectively, the treatments at greater concentration showed no signs of growth. The results of the treatments are shown in Table 1. The sodium carbonate-sodium borate mixtures are thus demonstrated to be effective for stain fungi inhibition at concentrations of C4B2 and above.

Example 2: Effectiveness of Sodium Carbonate Alone

Similar to Example 1, three groups of spruce-pine-fir veneers were prepared and treated with C6 and C12 only without the addition of sodium borate. Observations after 4 months showed that the percent fungal growth on the wood surfaces was 100% for the control, 25% for C6 and 0% for C12. These results suggest that the sodium carbonate by itself is also an effective chemical for suppression of fungal growth.

Example 3: Antistain Effectiveness on Ponderosa Pine

Ponderosa pine is well known for its susceptibility to fungal attack. A 2-foot length of a 2 in. by 8 in. cross section of air dried sapwood, which had been previously subjected to biological stain was used in this experiment. This piece of lumber was planed to have two smooth surfaces along its length and then cut into thirty-six 2 in. by 2 in. by 1 in. thick blocks.

Eight solutions of the new chemical treatments with differing concentrations of sodium carbonate and sodium borate were prepared as before. The formulas are shown in Table 2.

Eight hundred ml of solution was prepared for each of the above formulations. Four hundred ml was used as prepared and the remaining 400 ml was mixed with a 4% commercial wax with a trace of yellow iron oxide pigment added. Thus, sixteen formulations were prepared plus one control. In addition to the above formulations, one containing 0.8% tetrachlorophenate with 4% wax and pigment in water solution, similar to a commercial antistain dip, was prepared.

Two blocks of ponderosa pine were assigned to each treatment. The blocks were submerged for one to two seconds to thoroughly coat the surface and air dried at room temperature overnight. A water solution of fungi was prepared by soaking fungally infected wood in water for one week and the water solution decanted. The treated and control sample blocks were sprayed with the fungal solution (pH 5.2) and incubated at room temperature inside a covered glass container. The blocks were sprayed with water daily to maintain the moisture content and inspected weekly with a stereomicroscope to record fungal growth.

One week following treatment only the control blocks had mold growth. At two weeks, the control blocks not only had mold but also stain fungi and the C2B2 and C4B2 with wax and pigment showed very minor blue mold visible only through the microscope. However, C2B2 and C4B2 without wax or pigment showed no sign of growth, as did all higher concentration treatments with or without wax. The 0.8% tetrachlorophenate-wax-pigment treatment showed some mold growth with the appearance of black fungal stain.

After 30 days, the control and 0.8% tetrachlorophenate treated blocks showed massive surface growth of black fungi, while the C2B2 block had some mold fungi (pH indicator showed the surface of this block to be about 5). The mold on the C4B2 block had disappeared. The 5-month results on percent fungal infection area are shown in Table 2. All the treatments were highly effective. The formulations containing wax and pigment gave practically similar results to those which did not. It appears that C6B2 or higher concentrations completely inhibited the growth of the fungal species under the conditions of the experiment. The effectiveness of the sodium carbonate-sodium borate combination was again substantiated.

TABLE 2

| | Infected Area (% at 5 Months) | |
|---|---|---|
| Formulation | With Wax | Without Wax |
| Water (Control) | 100 | 100 |
| C2B2 | 4 | 7 |
| C4B2 | 2 | 0 |
| C6B2 | 1 | 0 |
| C8B2 | 0 | 0 |
| C10B2 | 0 | 0 |
| C15B2 | 0 | 0 |
| C20B2 | 0 | 0 |
| C30B2 | 0 | 0 |

C = Sodium Carbonate
B = Sodium Borate

The numbers in the formulations represent the chemical concentrations.

Example 4: Treatment of Aspen Wood

Ten samples of 12 in. by 12 in. aspen veneer (1/10 in. thickness) were obtained, one each from 10 different logs. These sample veneers were split into 1 in. by 12 in.

strips and separated into 11 groups. All groups had 10 veneer strips, each from a different log. One of the groups was used as a control and the others treated with the same chemical combinations and incubated under the same conditions as described in Example 1. Five months later, the controls showed complete coverage with white decay fungi. The treated sample results are shown in Table 3.

TABLE 3

| Formulation | Infected Areas (%) |
|---|---|
| Water (Control) | 100 |
| C0B2 | 28 |
| C1B2 | 5 |
| C2B2 | 8 |
| C4B2 | 42 |
| C6B2 | 40 |
| C8B2 | 30 |
| C10B2 | 8 |
| C12B2 | 6 |
| C15B2 | 6 |
| C20B2 | 1 |

The above results indicate that fungal growth on aspen (a hardwood) was different from that found with softwood species. The control was covered with a white decay fungi while treated specimens showed no such growth. While the results show considerable variability these chemical treatments are again proven to be effective on aspen, a hardwood, but its development trend was different from that of softwood.

Example 5: Antistain Effectiveness on Douglas Fir

One sample of Douglas fir sapwood veneer (12 in. by 12 in. by 1/10 in. thickness) was taken from each of 5 logs. Each sample was then cut into three 4 in. by 12 in. strips. Three groups were made up of 5 samples, one from each log. Two concentrations of treatment chemicals, C8B2 and C15B2 were prepared as previously obtained in Example 1. One group was kept as a control and the other two treated with chemical and sprayed with fungal solution as previously outlined in Example 1. After 5 months incubation at 22°-25° C. the infection areas were 100%, 3% and 0% for the control, C8B2 and C15B2 respectively. The chemical formulations are again proven to be effective for Douglas fir.

Example 6: Antistain Effectiveness on Western Hemlock

In laboratory experiments, three pieces of hemlock sapwood lumber (2 in. by 6 in. by 2 ft.) were selected green from the sawmill. These were cut into 2 in. by 1 in. by ½ in. blocks. The treatments and conditions of spraying and incubation are the same as for ponderosa pine described in Example 3. The results were essentially the same as for ponderosa pine.

With the accumulation of encouraging results in the laboratory, a field trial was carried out at the sawmill. About 100 pieces of green economy grade 2 in. by 6 in. western hemlock 8-foot long were used for this experiment. A package, 8 boards wide and 11 boards in depth, was constructed as follows: layers 1 through 4 were untreated controls; layers 5 through 8 were treated by spraying with C10B2 solution containing 4% wax and pigment made up as previously described; layers 9 through to 11 were treated with C10B2 without wax and pigment. The lumber pile was stored outdoors at a Vancouver, Canada mill during the summer of 1986. It was covered with a plastic sheet for the first three days and then exposed to the weather.

After 5 month's exposure the pile was dismantled and the average stain index measured by the standard provided by Forintex Canada Corporation. (R. S. Smith et al 1985. New Fungicidal Formulations Protect Canadian Lumber. Forintek Can. Corp. Special Publication No. SP-25. 18 P.).

Results are shown in FIG. 1. The control pieces were all stained with a stain index of 4.6 while the treatments with and without wax were 1 and 0.8 respectively.

The chemical treatment is therefore shown to be effective on western hemlock.

Example 7: Mill Run Trial on Green Spruce-Pine-Fir

Two hundred pieces of green spruce-pine-fir 2 in. by 4 in. by 8 ft. long were cut two days before chemical treatment. During that time it was stacked ¾ in. apart with wood spacers to provide an opportunity for air borne fungal spores to contaminate the wood surface.

A total of 5 piles of 40 pieces of lumber were prepared. One pile was left untreated as a control. Two piles were treated by spraying with C5B2 chemical treatment and the remaining two piles with C10B2. After spraying with chemical, the lumber was packed without spacers and completely wrapped in plastic and then paper wrapped for storage. The lumber was stored for a period of four months.

The stain index was determined as in Example 6. Completely clean lumber is assigned 0 and completely covered black stain 10. The control sample was not only attacked by stain and mold fungi but was also infected with white decay fungi. During this grading procedure a three-person consensus was used to arrive at the results which are shown in Table 4.

TABLE 4

| Treatments | No. of Samples | Average Stain Index |
|---|---|---|
| Control | 40 | 6.40 |
| C5B2 | | |
| Pile 1 | 40 | 0.08 |
| Pile 2 | 40 | 0.43 |
| C10B2 | | |
| Pile 1 | 40 | 0.42 |
| Pile 2 | 40 | 0.30 |

The above results clearly indicate the effectiveness of these antistain treatments.

FIRE RETARDANT PROPERTIES

Example 8: Laboratory Candle Burning Test

Four chemical treatment formulations were prepared as described in Example 1: C2B2, C6B2, C10B2, C30B2. Two additional formulations, C12B2 and C6B2, containing 4% wax and pigment were similarly prepared (Example 3). Pulp sheets were obtained from a nearby pulp mill and cut into 1 in. wide and 6 in. long strips. They were conditioned in an oven at 80° C. for two days to minimize moisture content. Three replicated pulp strips were dipped into each of the chemical solutions and oven dried at 80° C. for two days.

Control and treated strips were clamped upright and the tops lit with a propane torch for 3 seconds to initiate a flame. After removal of the torch, burning time, regardless of flame/no flame, was recorded. The length of strip consumed by the fire was expressed as a percent of total length. Results of burning time are shown in FIG. 2.

The control samples were burnt totally while the treated samples lost less than 5% of their length. FIG. 2 shows that the controls would continue burning indefinitely while the treated samples extinguished themselves in finite time. These results demonstrate the fire-retardant properties of the new chemical treatments.

Example 9: Laboratory Flame Spread Test—Aspen Veneer

Aspen veneer (⅛ in thickness) was cut into 1 in. wide by 12 in. long strips. One end of each strip (6 in.) was dipped into either chemical treatment C6B2 or C12B2 prepared as before. The other end of the strip was left untreated and used as a control. The strips were then dried in an oven at 80° C. for two days prior to testing. The fire testing procedure was the same as in Example 8.

The results showed that although the chemicals only coated the surface, results were similar to the treated pulp strips. The fire in the treated aspen went out rapidly on removal of the fire source, while the untreated controls stopped burning at the interface between the control and the treated ends showing the ability of the chemical treatment to stop the continuous flame and eventually quench the fire altogether.

Example 10: Laboratory Flame Test—Douglas Fir Plywood

Three pieces of Douglas fir plywood (3-ply) 12 in. by 12 in. in size were prepared. One-half of the plywood (6 in. by 12 in.) was painted with C6B2 or C12B2 chemical treatment both with wax and pigment, prepared as described previously. The another half of the face was left untreated as a control. Samples were then oven dried at 80° C. for two days.

A flame spread test was undertaken to compare the treatments with the controls. Samples were placed on a burning deck with a slope angle of 45° and a 4 in. propane torch flame applied to the end of the side of the wood sample being tested. The length of the flame spread was recorded every 10 seconds after torch contact. After 120 seconds contact with the plywood, the torch was removed and total burning time recorded.

FIG. 3 shows the results of the relationship between the flame spread length and burning time. The control flame spread was two times greater than that of treated samples after 30 seconds of testing. The flame of the control kept growing but the treated samples, after reaching a peak, decreased.

The fire growth time, as shown in FIG. 3, suggests the infinitive for the control while less than 20 seconds for the treated samples.

The effectiveness of the new chemical for fire retardation is again proven.

Example 11: Commercial Flame Spread Test

To confirm laboratory results, 20 pieces of 2 in. by 6 in. by 8 ft. long kiln-dried hemlock lumber (12% moisture content) were treated with C12B2 chemical concentration by spraying and tested in the Warnock Hersey Certification Agency's 25-foot fire tunnel in accordance with the Can.4 S102 M83 Standard.

The flame spread classification based on the standard was FSC1 22.

According to the Underwriter's Laboratory specification—"To be eligible for classification, the coating or system must reduce the flame spread of Douglas fir and all other tested interior combustible surfaces (having flame spread of 100 or greater by test) to which it is applied, by at least 50% or to a flame spread of 50 or less, whichever represents the lesser spread of flame." With a flame spread of 22, the new chemical treatment should be acceptable as a fire retardant.

The Canadian National Building Code, 1980, Appendix 11 (Section 3.1.12) Fire Retardant Treated Wood Systems, requires a flame spread rating of 25. The above rating of 22 would thus be acceptable for use in public buildings.

Example 12: Fish Toxicity of the Treatment

Chlorinated phenols are the most common antistain chemicals in commercial use. They are well known to be extremely toxic to humans and to fish. Fish toxicity is rated by the use of the 96 Hr. LC 50 Index—being the concentration of the toxic component which will be lethal to 50% of the test fish in a 96-hr. treatment under a standard set of conditions (J. D. Davis and R. A. W. Hoos, Use of Sodium Pentachlorophenate and Dehydroabietic Acid as Reference Toxicants for Salmonid Bioassays, J. Fish. Res. Board Can. Vol. 32(3)411-16 (1975). Comparative toxicities for sodium pentachlorophenate powder, an industrial polychlorophenate dip tank solution, and the 6% sodium carbonate-2% sodium borate solution are given in Table 5.

TABLE 5

| Chemical Treatment | 96 Hr. LC50 ppm |
|---|---|
| Sodium Pentachlorophenate Powder | 0.03 to 0.12 |
| Industrial Dip Tank Solution | 145 |
| 6% Sodium Carbonate-2% Sodium Borate Solution | 22,300 |

As can be seen from Table 5, the sodium carbonate-sodium boarate solution is less than 1% as toxic as the present polychlorophenate solutions used in industrial antistain dip tanks.

The experimental results support the claim that sodium carbonate-sodium borate solution treatments prevent fungal attack on wood and also contribute substantially to the fire resistance of wood. In practical application, the solutions can be directly applied to lumber by soaking or spraying.

Variations, departures and modifications lying within the spirit of the invention or the scope as defined by the appended claims will be obvious to those skilled in the wood treatment art.

I claim:

1. A method for protecting wood that comprises applying to the surfaace of the wood a solution consisting essentially of about 4 to 30 parts by weight of sodium carbonate, about two parts by weight of sodium borate and the balance of the solution being about 100 parts by weight water.

2. A method as claimed in claim 1 in which the solution is applied by dipping the wood into the solution for at least ten seconds.

3. A method as claimed in claim 1 in which the solution is applied by spraying.

4. A method as claimed in claim 1 in which the pH is in the range 10 to 11.

5. A method as claimed in claim 1 in which the solution contains a wax.

6. A method as claimed in claim 1 in which the solution contains a pigment.

7. A method of protecting wood against fungal growth that comprises applying to the surface of the wood an aqueous solution of sodium carbonate consisting essentially of about 4 to 30% by weight of sodium carbonate.

8. A method as claimed in claim 7 in which the solution contains at least 6 grams of sodium carbonate per 100 milliliters of solution.

9. A method as claimed in claim 7 in which the solution also contains about two parts by weight sodium borate per 100 milliliters of solution.

10. A composition useful in the protection of wood and consisting essentially of about two parts by weight of sodium borate, about 4 to 30 parts by weight sodium carbonate and the balance about 100 parts by weight water.

11. A composition as claimed in claim 10 in which the solution also contains a wax.

12. A composition as claimed in claim 10 in which the solution also contains a pigment.

* * * * *